United States Patent

[11] 3,611,310

[72] Inventors Bobby A. Creech
Glendora;
Benjamin A. Dent, Altadena; Erwin A. Hauck, Arcadia, all of Calif.

[21] Appl. No. 846,010
[22] Filed July 30, 1969
[45] Patented Oct. 5, 1971
[73] Assignee Burroughs Corporation
Detroit, Mich.

[54] DISCRIMINATING STORE OPERATOR METHOD AND APPARATUS FOR DATA PROCESSORS
13 Claims, 8 Drawing Figs.

[52] U.S. Cl. .......... 340/172.5
[51] Int. Cl. .......... G06f 9/20
[50] Field of Search .......... 340/172.5

[56] References Cited

UNITED STATES PATENTS

| | | | |
|---|---|---|---|
| 3,201,761 | 8/1965 | Schmitt et al. | 340/172.5 |
| 3,222,649 | 12/1965 | King et al. | 340/172.5 |

*Primary Examiner*—Raulfe B. Zache
*Attorney*—Christie, Parker & Hale

ABSTRACT: A data processing system having a memory with memory locations containing words including operand words and address reference words. An operand stored in a memory location is linked to a first reference word directly or through other address reference words by a memory address signal in each reference word, each of the words contain a type signal identifying the type of the associated word. The word in the memory location referenced by the address signal in the first reference word is read, and any words referenced by the read address reference words are read until an operand word is read. The type signals of the words read are monitored for an operand type word. A desired word is stored into the memory location from which an operand word is read. The method includes the steps of reading from the memory the word referenced by the first address reference word and any words referenced by such read word until an operand word is read. The type signals of the words read are monitored for an operand type word. A desired word is stored into the memory location from which a word is read having an operand type signal.

INVENTORS
BOBBY A. CREECH
BENJAMIN A. DENT
ERWIN A. HAUCK
BY
Christie, Parker & Hale
ATTORNEYS

DISCRIMINATING STORE OPERATOR METHOD AND APPARATUS FOR DATA PROCESSORS

BACKGROUND OF THE INVENTION

1. Field of the Invention

This invention relates to data processing apparatus and, more particularly, to means for executing a store operator in a data processor. This invention also relates to a method for storing an information unit in a memory of a data processing system.

Description of the Prior Art

Data processors are known which execute store operators. The store operator normally causes an information unit contained in a register to be stored into a specified memory location. Data processors are also known having an overwrite operator. The overwrite operator is similar to a store operator. The difference between overwrite and store operators is that a store operator will not cause information to overwrite information which is protected by a special code indicating that such word is protected information. By way of contrast, an overwrite operator allows protected information to be overwritten.

Two forms of the store and overwrite operators are known and are called destructive and nondestructive forms. The nondestructive form is one in which the information to be written is retained in the register from which it is written into memory. The destructive form causes the information being stored in memory to be cleared from the register from which it is written into memory.

Prior art data processors contain hardware mechanisms which responded to a store operator to store the desired information in a memory location specified by an actual address. The address is also stored in a register. However, many times preliminary steps must be taken care of before the store operator is executed. For example, the address may be an indirect address reference word which points indirectly to the location in memory where the information is to be stored in response to the store operator. In other words, the indirect reference word may reference the desired memory location directly or indirectly through one or more other indirect address reference words. With such an arrangement it is necessary to use the indirect reference words to obtain the address of the actual memory location where information is to be stored. Also, prior art data processors must anticipate the presence of an indirect address reference word and by preliminary operating steps derive the actual address before execution of the store operator. This requires the programmer to keep track of the types of address reference words being used and requires complicated and time-consuming programming steps preliminary to the execution of the actual store operator.

Many times different sets of data in different data formats may be processed by the same program. Thus, it may be necessary to preprocess one of the sets of data to change codes before the execution of a store operator in the common program. Prior art data processing systems normally require preliminary processing and a programmer is required to keep track of the need for such preliminary processing before the store operator is encountered.

The need for preliminary processing before a store operator is executed is brought about by the fact that apparatus in prior art data processors do not contain any means for automatically interpreting the address word associated with the store operator.

SUMMARY OF THE INVENTION

By way of contrast, an embodiment of the present invention allows a single address reference word or a chain of interconnected address reference word to be automatically monitored and interpreted in response to a store operator. The store operator has a primary objective to store an operand, but this primary objective may be overriden depending on the interpretation of the addressing chain. The present invention allows a data processor to be formed in which the store operator is executed in a manner which is compatible with the data structure being executed. To this end, a data processor is provided which automatically executes a store operator having an associated address reference word pointing directly to the actual memory location where storage is to take place or indirectly through one or more address reference words. The storage mechanism automatically monitors the linked address words to determine the actual address where the information is to be stored in response to the store operator. It is not necessary to know in advance the type of address word associated with the store operator.

The present invention also allows a data processor to be formed which, during the execution of a store operator, can automatically branch to another procedure and dynamically generate or compute the address to be used with the store operator.

Important elements in achieving the foregoing advantages are tag or type signals which identify each word and a mechanism which dynamically monitors and evaluates an address reference word or a chain thereof. Also of importance, is a memory protection mechanism and a flashback mechanism.

The type or tag signals in in each word distinguish words between operand words and address reference words, and even distinguish different types of address reference words. This allows the monitoring and evaluating mechanism to react differently in response to the same store operator if directed at a different address reference word or a chain thereof for different sets of data. The monitoring and evaluating mechanism has the ability to dynamically evaluate the address reference word chains and automatically determine the actual memory location where data is to be stored.

This facility also allows automatic entry into a special procedure which can compute or derive an address to be used for storing the desired data in response to the store operator. Thus, on the surface, the machine simply executes a store operator but the functions invoked may be quite complex and, in fact, a major portion of the total machine logic may be called upon to complete the store operator.

The memory protection and flashback mechanisms provide the processor with the apparent ability to blindly attempt to store data into a memory cell. If the contents of the memory cell is an address reference word, it is memory protected and writing in the cell is inhibited. As a result, the address reference word in the memory cell remains unaltered. However, the address reference word is flashed back to the data processor and is used to connect up the addresses in the chain of address reference words. In this manner, the data processor is able to evaluate a list of address reference words in a manner which does not alter address reference words in memory and finally store into the desired memory location where an operand is located.

Briefly, an apparatus in accordance with the present invention is in a data processing system having a memory with memory locations containing words including operand words and address reference words. An operand stored in a memory location is linked to a first reference word directly or through other address reference words by a memory address signal in each reference word, each of the words contain a type signal identifying the type of the associated word. Means is provided for reading from the memory the word in the memory location referenced by the address signal in the first reference word, and any words referenced by the read address reference word until an operand word is read. Means is provided for monitoring the type signals of the words read for an operand type word. Means is provided for storing a desired word into the memory location from which an operand word is read.

Briefly, a method for storing a word in accordance with the present invention applies to a data processing system wherein the memory location for storage contains an operand and is linked through one or more address reference words to a first address reference word. The address reference word and the operand word contain type identification signals. The method includes the steps of reading from the memory the word referenced by the first address reference word and any words referenced by such read word until an operand word is read. The type signals of the words read are monitored for an operand type word. A desired word is stored into the memory location from which a word is read having an operand type signal.

DESCRIPTION OF THE PREFERRED EMBODIMENT

Figure 1:
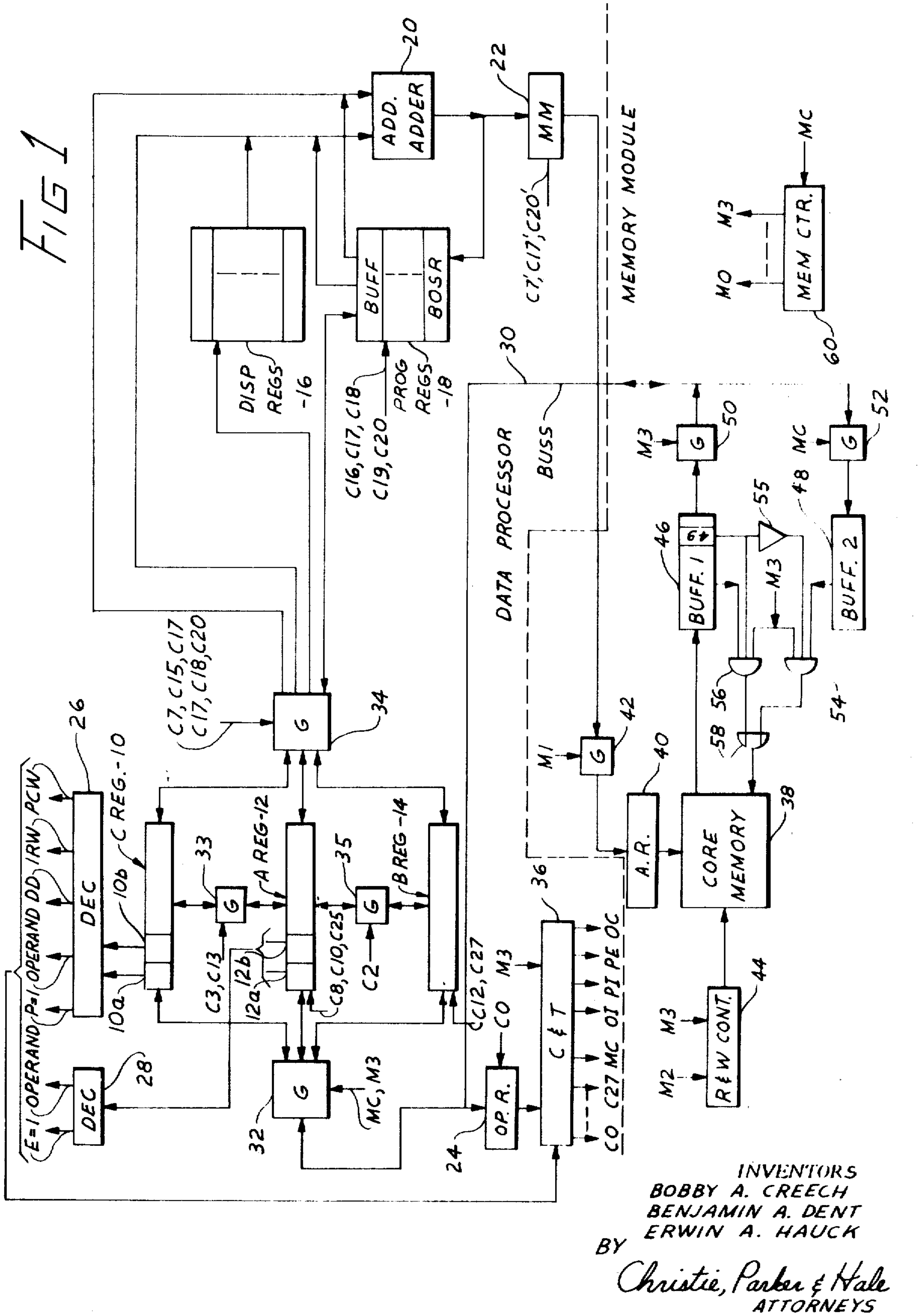
FIG. 1 is a block diagram of a data processing system and embodying the present invention.

Consider an embodiment of the present invention. FIG. 1 shows a data processor above the dashed line and a memory module below the dashed line. The data processor has C, A and B registers 10, 12 and 14 which are conventional flip-flop registers. The A and B registers 12 and 14 together with memory locations in a core memory in the memory module form part of a stack of information. A plurality of display registers are shown at 16. Each display register 16 contains the absolute address of a word in the stack located in the core memory and is used in forming the absolute address of memory locations as disclosed in more detail hereinafter.

A plurality of program registers including a BUFF register and a BOSR register are shown at 18. The BUFF register is merely a buffer register for intermediate storage of partial addresses and the BOSR register stores the address of a memory location in core memory which is the base of the stack currently being used. To be explained in more detail, the addresses in the BOSR and BUFF registers are combined with portions of address reference words to form actual addresses of memory locations in core memory where reading and writing is to take place.

A conventional full binary adder 20 is provided for adding partial address signals together to form a complete address of a location in the core memory. A register MM 22 is provided for temporarily storing an address before it is applied to the memory module. An operator register 24 stores an operator, including the store operator, read from the memory.

Decoders 26 and 28 are provided for decoding certain portions of the words stored in the C register 10 and the A register 12, respectively, to be explained in more detail, the C register 10 has a section 10*A* and a section 10*b* in which TAG signals and a presence bit (P), respectively, are stored. The decoder 26 is coupled to the sections 10*a* and 10*b* of the C register 10 and, depending on the content thereof, applies control signals at one or more of the output circuits indicated in FIG. 1. The A register 12 has sections 12*a* and 12*b* in which TAG signals and an E bit, respectively, are stored. The decoder 28 is responsive to the content of sections 12*a* and 12*b* for applying a control signal at one or more of its output circuits shown in FIG. 1.

Gate 33 transfers the content of the C register 10 to the A register 12 and vice versa. A gate 35 transfers the content of the A register 12 to the B register 14 and vice versa. A gate 35 transfers the content of the A register 12 to the B register 14 and vice versa.

A bus 30 connects the memory module to the data processor. A gate 32 couples the registers 10, 12 and 14 to the memory bus 30. A gate 34 couples the registers 10, 12 and 14 to the display register 16, the program registers 18, and the address adder 20. The details of operation and construction of gates 32 and 34 will be described in more detail in connection with the flow diagrams of FIGS. 2A through 2B.

A control and timing unit (C & T) 36 is provided for sequencing the operation of the data processor. The control and timing unit 36 has output circuits referenced by the symbols C0–C7, C7', C8–C17, C17', C18–C20, C20', C21–C27, and MC which normally sequence the operation of the system. For purposes of illustration only C0 and C27 are shown in FIG. 1, the other outputs being represented by dashed lines. The C & T 36 can be considered as having a state of operation corresponding to each output circuit. The C & T 36 also has output circuits referenced by the symbols 0I, PI, and PE which cause special interrupt functions to be performed. The C & T 36 has an output circuit referenced by the symbol 0C at which a control signal is formed when the execution of an operator is complete. The construction and sequence of operation of the C & T 36 are illustrated in the flow diagrams of FIGS. 2A through 2D and will be described in more detail hereinafter.

Refer now to the memory module. The memory module has a conventional core memory 38 along with its associated address register 40. A gate 42 gates the addresses stored in the MM register 22 into the address register 40. A conventional read/write control 44 controls reading and writing in the core memory 38. In contrast to conventional core memories, the core memory 38 has two information or buffer registers 46 and 48. The register 46 is referred to as BUFF 1, whereas the register 48 is referred to as BUFF 2. Whenever a read or write operation takes place the content of the addressed memory location is stored in BUFF 1 and a gate 50 couples the content of BUFF 1 back to the memory bus 30 to the data processor. Whenever a word is to be written into the core memory 38 a gate 52 stores the word from the bus 30 into BUFF 2. Gates 54, 56, and 58, and inverter 55 cause the content of either BUFF 1 or BUFF 2 to be stored back in the core memory 38 during the write phase of the write operation. A memory counter 60 is provided for sequencing the operation of the memory module. The memory counter 60 has outputs referenced by the symbols M0 through M3. M1 and M2 are represented by dashed lines. A memory module such as that shown in FIG. 1, is shown and described in a copending patent application entitled "Digital Memory with Automatic Overwrite Protection" having Ser. No. 670,101 filed Sept. 25, 1967 now abandoned and refiled as a continuation application bearing Ser. No. 27,190 on Apr. 9, 1970, and assigned to the same assignee as the present application.

Figure 3:
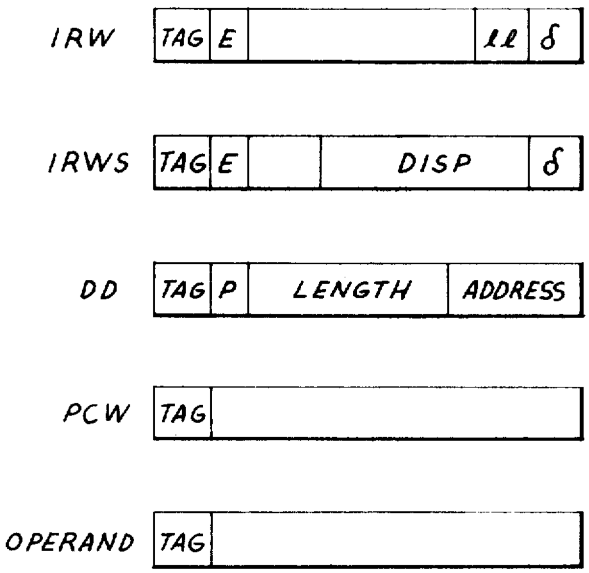
FIG. 3 is a sketch illustrating the word format of various address reference words used by the data processing system of FIG. 1.

Refer now to FIG. 3 and consider the structure of the various words encountered in the data processing system of FIG. 1. All of the words encountered have a TAG which identifies the type of word. Each TAG has a plurality of bits and the combination of states thereof identify the type of the corresponding word. Thus, an operand word contains a TAG which identifies the word as being an operand. The operand TAG is important because whenever a store operation is to take place, the word which is to be stored must be stored at a location which contains an operand and not at a location that contains an address reference word. The operand TAG is used to signal the system when an operand is encountered. Four different types of address reference words are encountered in the system of FIG. 1. Indirect Reference Word (IRW) and Indirect Reference Word STuffed (IRWS) are address reference words which have addressing parts which reference or point either to another IRW OR IRWS, a data descriptor (DD), or a program control word (PCW), or to an operand. Both an IRW and an IRWS contain a TAG and an E bit. The same TAG is both, IRW or IRWS. If the E bit is a 1 bit, it identifies the word as being an IRWS, whereas if the E bit is a 0 bit, it identifies the word as being an IRW.

An IRW contains a lexicographical level (*ll*) and a displacement value ($\delta$). The *ll* identifies one of the display registers 16. $\delta$ is a value which, when added to the address contained in the display register (identified by *ll*), gives the absolute address in the core memory 38, actually pointed to or referenced by the corresponding IRW.

An address reference word is said to point or reference another word when the address reference word contains address signal parts which are used to derive the address of such other word. Thus, in an IRW the *ll* value identifies a display register which contains an address which, added to the δ value, gives the address of another memory location in core memory.

An IRWS contains a displacement (DISP) value and an increment value (δ). The DISP is a value which, when added to the address of the base of the stack presently in use (contained in the BOSR register in 18) and to the δ value in the same IRWS, gives the absolute address in the core memory 38 actually referenced by the IRWS.

Data descriptors (DD) are address reference words which can reference another DD or an operand. A DD cannot reference an IRW or an IRWS. A DD contains a TAG identifying that it is a DD and a presence bit (P) which identifies whether the operand referenced by the DD is present in the core memory 38. The data descriptor also contains a LENGTH value and an ADDRESS value which, when added together, provides the absolute address of the memory location in the core memory 38 referenced by the corresponding DD.

A PCW contains a TAG identifying the word as a PCW and address parts (not shown) which reference a different procedure for execution by the data processor. Whenever a PCW is encountered, it causes the data processor to change to the procedure referenced by the address parts of the PCW.

Figure 4:
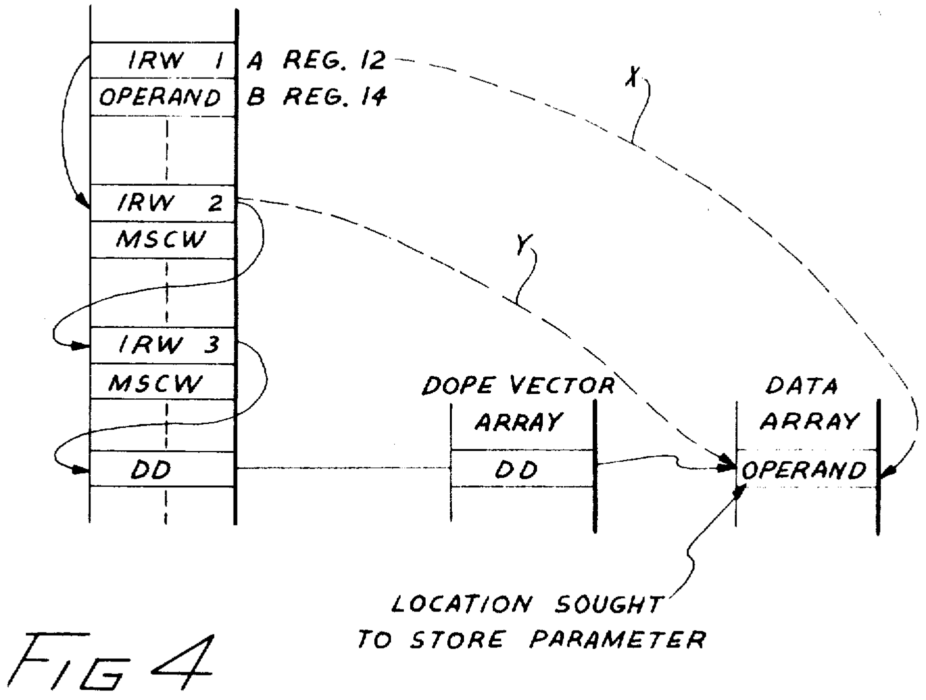
FIG. 4 is an example of a stack having address reference words linked through a data descriptor to an array of data containing an operand which may be utilized by the data processing system of FIG. 1.

Refer now to FIG. 4 which gives an example of a stack that may be stored in the A and B registers and the core memory 38. Lines with arrows are used to illustrate the way in which the address reference words reference a location where an operand is to be stored. The A and B registers 12 and 14 are the top two registers of the stack and are illustrated as containing an IRW and an operand, respectively. Mark stack control words (MSCW) are provided at various levels in the stack. For each MSCW there is a display register 16 which contains an absolute address of the memory location in core memory where the corresponding MSCW is stored. Other details of such a stack structure along with the associated display registers is disclosed in U. S. Pat. No. 3,548,384 entitled "Procedure Entry for a Data Processor Employing a Stack," in the name of Barton et al. and assigned to the same assignee as the present application.

A store operator will cause the operand contained in the B register 14 to be stored in a memory location containing an operand. By way of example, the operand is shown in a data array. The first IRW (in the A register 12) and the operand (in the data array) are linked together in a chain. By way of example, FIG. 4 shows the IRW in a register 12 linking through two subsequent IRW's and a DD in the stack, a DD in a dope vector array to the operand. The data processor is arranged so that it automatically inspects each of the address reference words (IRW's and DD's) down through the chain and prevents each from being overwritten with the operand to be stored. Only when the operand in the data array is reached, does the data processor store the operand contained in the B register 14. The storage takes place in the memory location where the operand is stored.

DESCRIPTION OF OPERATION

Figure 2C:
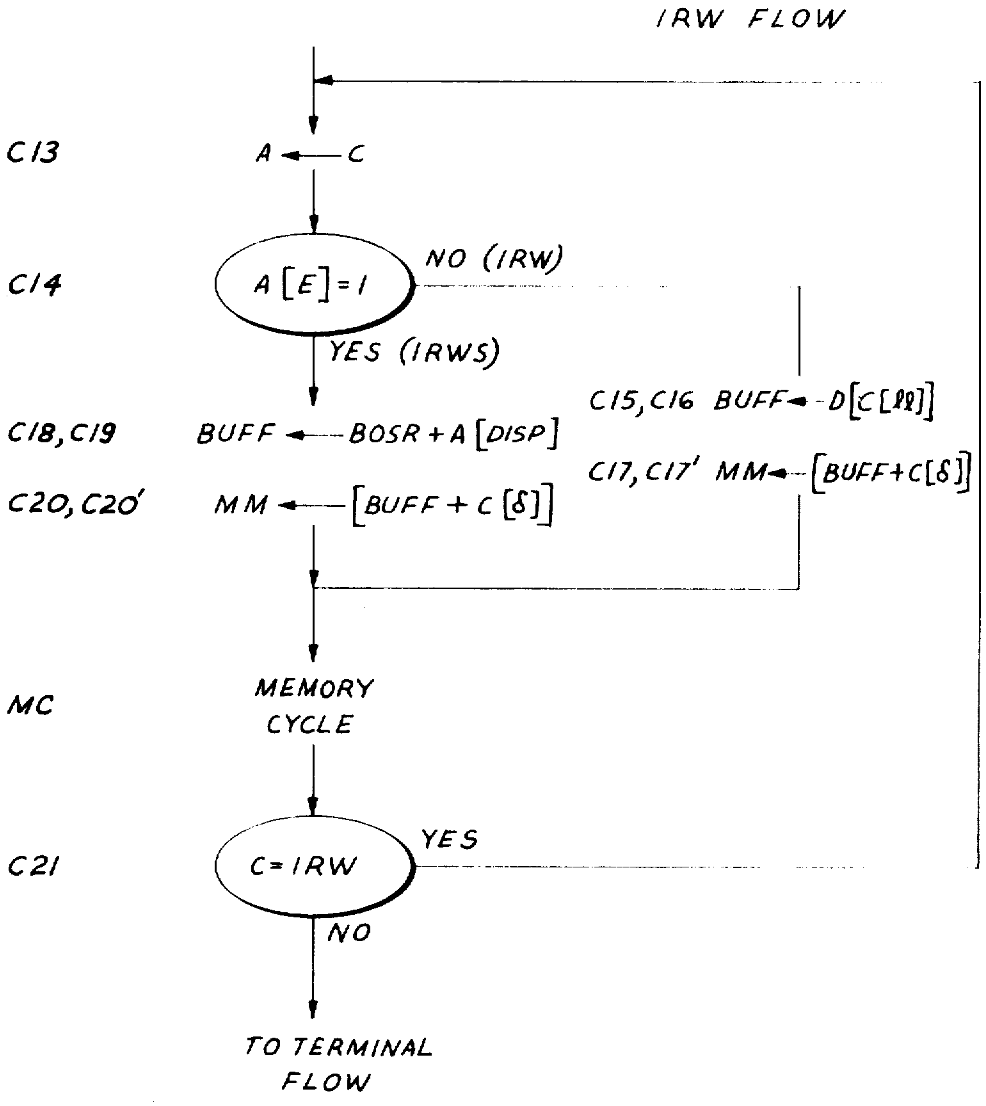
FIGS. 2A through 2E are flow diagrams illustrating the sequence of operation of the data processing system of FIG. 1.
Figures 2D, 2E:
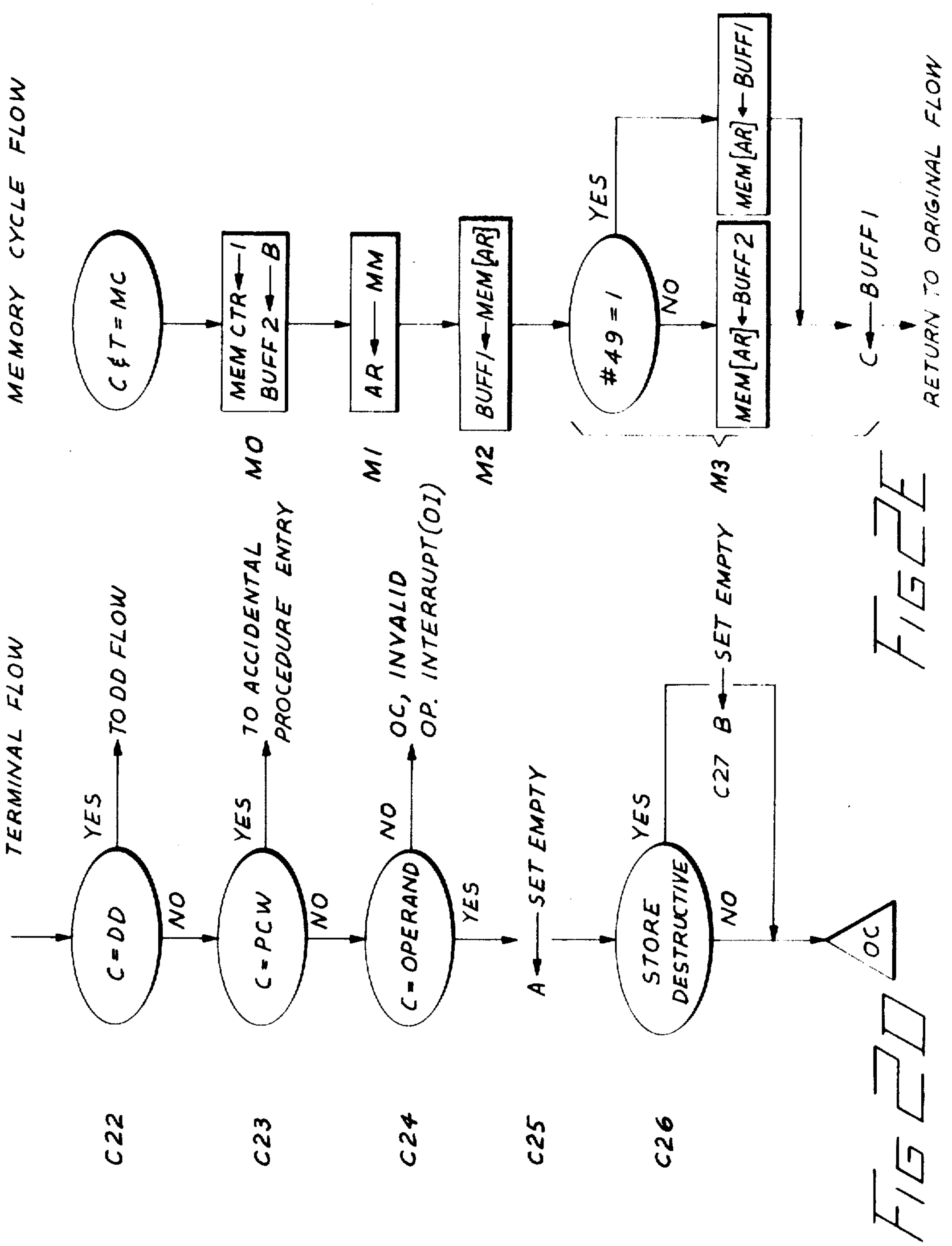
Figure 2B:
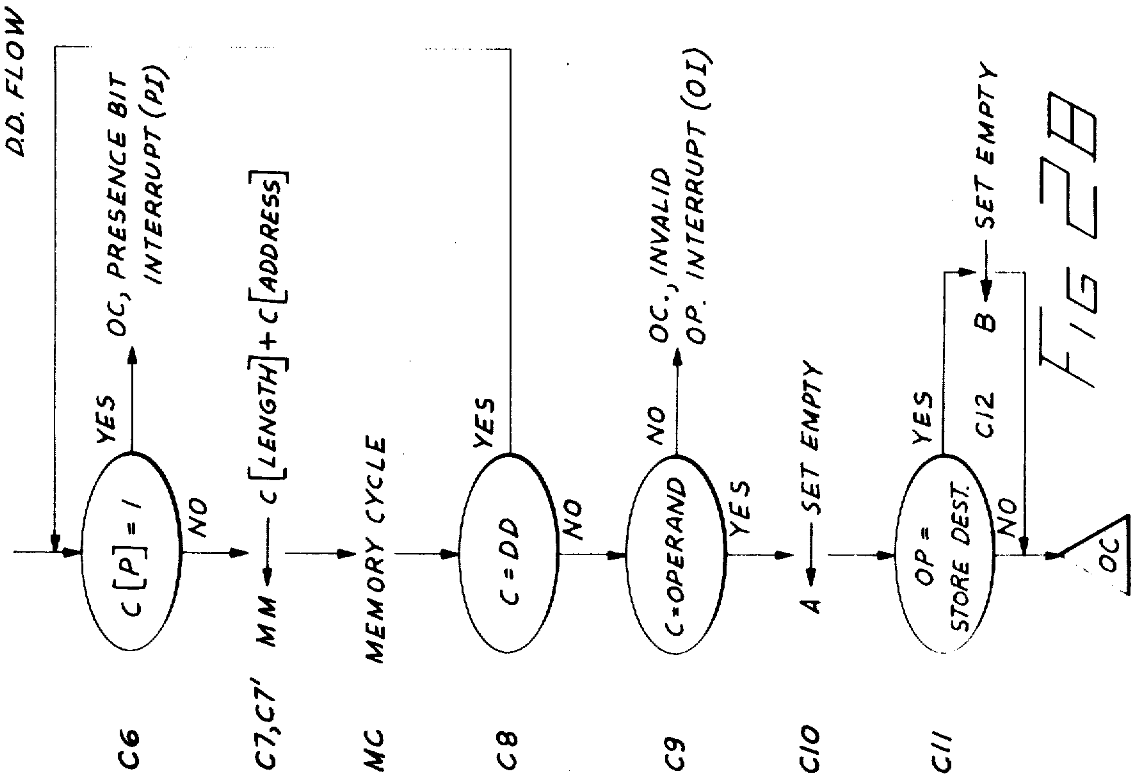
Figure 2A:
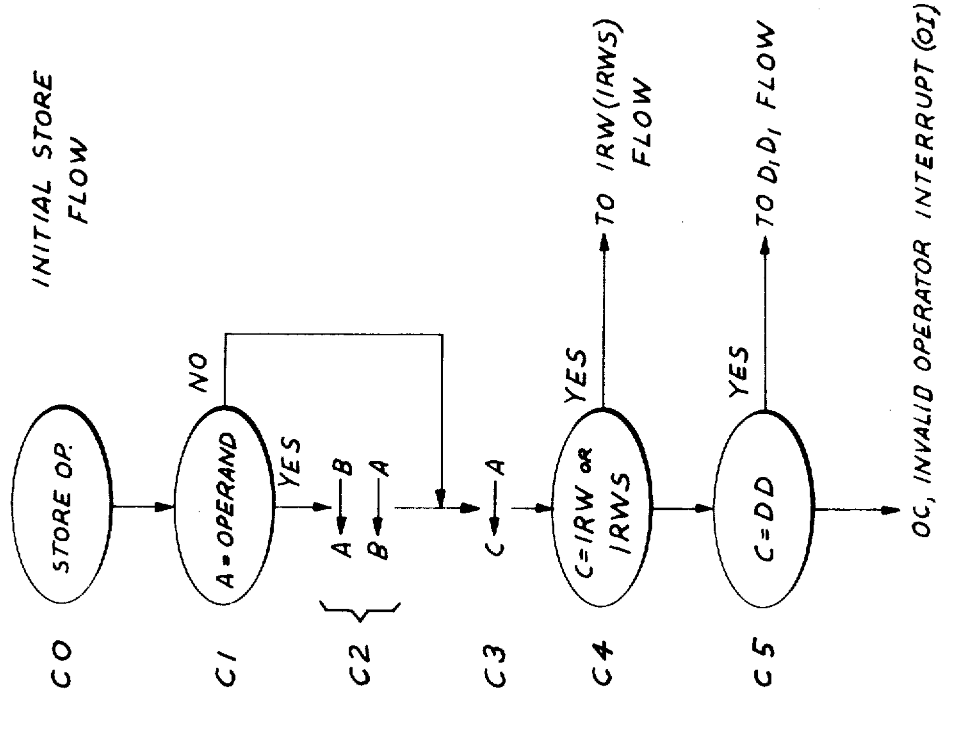

Consider now the operation of the system of FIG. 1 with reference to the flow diagrams of FIGS. 2A through 2E. FIGS. 2A through 2D form a flow diagram illustrating the sequence of operation of the data processor as it scans through one or more address reference words to find a memory location containing an operand where a word can be stored. The operation is all in response to a store operator stored in the operator register 24. At certain points in the flow diagram of FIGS. 2A (i.e. FIG. 2B and 2C) a memory operation by the memory module is required. FIG. 2E is a flow diagram illustrating the sequence of the operation of the memory module during a memory operation.

The system of notation used in the flow diagram should be kept in mind. The circled portions of the flow diagrams represent a condition which needs to exist before proceeding to the next step in the flow. The other symbols in the flow diagram illustrate action items as will be described hereinafter. To the left of the various symbols in the flow, the symbol C followed by a numeral appears (i.e. C1, C2, etc.). These symbols correspond to the output signals from the control and timing unit 36 of FIG. 1 and indicate the output circuit of the C & T 36 receiving a control signal for each step in the flow. The action represented by the rest of the symbols will be described in the following discussion and the symbols can be understood by following the discussion.

Assume now that an operator has been read out of the core memory 38 and stored in the operator register 24. Also assume that the A register 12 contains the operand which is to be stored into the core memory in response to the store operator and that the B register contains one of the address reference words. A description of these operations is not given herein since the way in which operators, operands and address words are obtained from memory and stored into registers is well known in the computer art. Initially the C & T 36 is in state 0 and forms a control signal at C0. The C & T 36 is responsive to the store operator to enter state 1 where a control signal is formed at the C1 output. During state 1 the A register 12 contains an operand and the TAG contained in section 12*a* identifies an operand word. This causes the decoder 28 to form a control signal at the OPERAND output, causing C & T 36 to go to state 2 (indicated by YES, FIG. 2A). The reason that state 2 is entered is to interchange the content of the A and B registers. The content of the two registers is interchanged because the B register must contain the operand and the A register and the address reference word before the remainder of the operation can take place. To this end, the control signal at the C2 output causes the gate 35 to interchange the words stored in the A and B registers so that the A register now contains the address reference word and the B register, the operand.

If the A register had initially contained the address reference word, no control signal would have been formed at the OPERAND output of the decoder 28 and the C & T unit 36 would have gone from state 1 directly to state 3 (indicated by NO, FIG. 2A) thereby bypassing state 2. Following state 2, and the C & T 36 goes to state 3.

The control signal at C3 causes the gate 33 to transfer the address reference word contained in the A register 12 into the C register 10. Following state 3, the C & T 36 goes to state 4.

During state 4 a determination is made as to whether the reference word contained in the C register is an IRW or an IRWS. To this end, the decoder 26 decodes the TAG signals in 10*a* and forms a control signal at the IRW output if the word is either an IRW or an IRWS. An output signal at the IRW output from the decoder 26 causes the C & T 36 to go to state 13 where the IRW flow is entered. (See FIG. 2C.) If during state 4 the address reference word contained in the C register 10 is not an IRW or an IRWS, the lack of a control signal at the IRW output of the decoder 26 causes the C & T 36 to enter state 5, (indicated by NO, FIG. 2A).

During state 5 a determination is made as to whether the address reference word now in the C register 10 (transferred from the A register 12) is a DD. If the word is a DD, the decoder 26 forms a control signal at the DD output which causes the C & T 36 to go to state 6 where the DD flow is entered (FIG. 2B).

If during state 5 the word in the C register 10 is not a DD, it means that an invalid condition exists and that the operation of the data processor must be interrupted. To this end, the C & T 36 forms a control signal at the 0I output indicating an invalid operator interrupt condition and a control signal is formed at the 0C output indicating that the operation is complete. Subsequently the C & T returns to state 0. The interrupt operation is not described herein as it is not important for an understanding of the present invention.

Assume now that during state 5 of the C & T 36 a DD was found to be stored in the C register 10 and a control signal is formed at the DD output of the decoder 26 causing state 6 to be entered. State 6 is the first state of the DD flow shown in FIG. 2B.

During state 6 a check is made to determine if the operand referenced by the DD in the C register is present. The P bit of the DD indicates this information. If the P bit, contained in 10*b* is a 1, it means that the operand is not present and hence an error condition exists. Accordingly, the C & T 36 forms a control signal at the PI output indicating that a presence bit interrupt error condition exists and a control signal is formed at the 0C output indicating that the execution of the operator is complete.

Assume that during state 6 the P bit is 0 and hence the decoder 26 does not form a control signal at the P=1 output. This causes the C & T 36 to go to state 7 followed by state 7'. During states 7 and 7', the LENGTH and ADDRESS values of the DD in the C register 10 are added together to form the absolute address of the memory location referenced by the DD. To this end, the control signal at C7 causes the gate 34 to gate the LENGTH value through to one input of the address adder 20 and the ADDRESS value through to the other input of the address adder 20. The address adder 20 automatically adds the two values together and forms the result representing the absolute address desired in core memory. The control signal at C7 causes the MM register 22 to store the result. Following state C7', the C & T 36 forms a control signal at the MC output initiating a memory cycle in the memory module as illustrated in FIG. 2E.

Refer to FIG. 2E and consider the operation of the memory module. A control signal at the MC of the C & T 36 causes the gates 32 and 52 to store the operand contained in the B register 14 into the BUFF 2 register and sets the memory counter 60 into state 1, causing a control signal at the M1 output.

During state 1 of the memory counter 60, the control signal at M1 causes the gate 42 to store the address from the MM register 22 into the AR register 40. Following state 1, the memory counter 60 goes to state 2.

During state 2 of the memory counter 60, a control signal is formed at M2. The control signal at M2 activates the read and write control unit 44, causing the core memory 38 to read out the content of the memory location specified by the address in the AR register 40, causing the word to be stored in the BUFF 1 register 46. The TAG bits are coded so that bit 49 is a 1 for all words (pertinent to this discussion), except for operands. If the bit 49 is a 1, it indicates that the word stored in BUFF 1 is something other than an operand and that such words is a protected word and must be stored back into core memory 38 in the same location from which it was read. To this end, the gate 56 has an input from bit 49 in the BUFF 1 register and an input from the M3 output of the memory counter 60. Following state 2, the memory counter goes to state 3 applying a control signal at the M3 output causing the gate 56 to gate the word in BUFF 1 through the 0R gate 58 back to the core memory 38. The control signal at M3 causes the read and write control unit 44 to write the word applied to its input back into the memory location specified by the address AR 40. Thus, the word gated through gates 56 and 58 from BUFF 1 is rewritten into the core memory into the same memory location from which it was read. Core memories are well known which have a write cycle following a read cycle.

If bit 49 is a 0, it indicates that the word read from the core memory 38 is an operand, and hence that the operand contained in the BUFF 2 register is to be stored into the memory location from which the word in BUFF 1 is read. To this end, the inverter 55 inverts the 0 output from bit 49 and applies a control signal to the gate 54. The control signal at M3 then causes the gate 54 to store the operand in BUFF 2 into the memory location specified by the address in AR 40. Additionally, the control signal at M3 causes the gates 50 and 32 to gate the word stored in BUFF 1 back into the C register 10.

Thus, it should now be evident that the gates 54, 56, 58 and inverter 55 form a means for monitoring the words read from the core memory 38 to determine whether each word is an operand or an address reference word. If the word is an operand, then the operand in BUFF 2 (obtained from the B register 14) is stored into the memory location from which the word was read. If, on the other hand, the elements 54 through 58 determine that the word read from the core memory is a protected word including any of the address reference words, the word in BUFF 1 is rewritten back into the same memory location of the core memory 38 from which it was read so that it is left unaltered.

Return now to the DD flow of FIG. 2B. Following the control signal at M3, the C & T 36 continues with the control for the DD flow. The control signal at M3 causes the C & T 36 to go to state 8 forming a control signal at the C8 output.

During state 8 a determination is made of whether the new word read from memory 38 and now contained in the C register 10 is a DD. If the word is a DD, the TAG so indicates and the decoder 26 forms a control signal at the DD output.

Assume that during state 8 of the C & T 36 the decoder 26 forms a signal at the DD output indicating a DD in the C register 10. The C & T 36 automatically goes back to states 6, 7, 7' and MC repeating the operations discussed hereinabove.

Assume that a word is finally stored in the C register 10 that is not a DD. Under these conditions a control signal will not be formed at the DD output of the decoder 20 causing state 9 of the C & T 36 to be entered, following state 8.

During state 9 a check is made to see whether the C register 10 contains an operand. If the C register contains an operand, a control signal is formed at the OPERAND output of the decoder 26 which causes the C & T 36 to go to state 10. However, if during state 9 no control signal is formed at the OPERAND output of the decoder 26, indicating that an operand is not stored in the C register, the C & T 36 forms a control signal at the OI output, indicating an invalid operand interrupt and a control signal is formed at the OC output indicating that the execution of the operator is complete.

Assume that the word stored in the C register is an operand and the decoder 26 forms a control signal at the OPERAND output. This causes the C & T 36 to go to state 10.

Assume that the C & T 36 is in state 10 and that an operand is now contained in the C register 10. The control signal at C10 causes the content of the A register 12 to be cleared (by gating, not shown) and the C & T 36 goes to state 11.

There are two different types of store operators that can be stored in the register 24 and executed by the data processor. One is a store destructive operator and the other is a store nondestructive. A store destructive operator means that the operand contained in the B register 14 is to be cleared out or destroyed. A store nondestructive operator means that the operand stored in the B register 14 is to saved or retained. If the operator stored in the operator register 24 is a store nondestructive operator, the C & T 36 goes from state 11 to a state wherein a control signal is formed at the OC output indicating that the operator is complete. Assuming that the operator is a store destructive operator, the C & T 36 goes from state 11 to state 12. The control signal at the C12 output causes gating (not shown) to reset the content of the B register 14 to 0 or clear out the content thereof. Following state 12, the C & T 36 goes to a state causing the control signal at the 0C output as described hereinabove.

It should now be evident that a memory location containing an operand into which another operand is to be stored is linked either directly or indirectly through address reference words to a first address reference word and that the decoder 26 and C & T unit 36 form means for monitoring the address reference words as they are read from memory to determine when the operand is obtained. Each time an address reference word is obtained instead of the desired operand, the word referenced by the address reference word is caused to be read out by the C & T 36 until the operand is reached.

Return now to state 4 of the C & T 36 and assume that the decoder 26 forms an output signal at the IRW output indicating that an IRW or IRWS is contained in the C register 10. Under these conditions, the C & T 36 will go from state 4 to state 13.

The control signal at the C13 output causes the gate 33 to store the IRW or IRWS contained in the C register 10 into the A register 12 and the C & T 36 goes to state 14. Thus, at this point both the A and C registers contain the IRW or IRWS.

During state 14 a check is made to see whether the address reference word contained in the A register 12 is an IRW or an IRWS. To this end, the decoder 28 forms a control signal at the E=1 output if the word is an IRWS and does not form a control signal at the E=1 output if the word is an IRW. Assume that the word is an IRW. Accordingly, the C & T 36 goes from state 14 to state 15. During states 15 through 17′ of the C & T 36, an absolute address is formed using the address information of the IRW contained in the C register 10. According to FIG. 3, it will be noted that the IRW contains a *ll* value and a δ value. The *ll* value identifies one of the display registers in 16. The control signal at C15 causes the gate 34 to apply the *ll* value in the IRW contained in the C register 10 to the display register 16, causing the address contained in the corresponding display register to be read out and applied to one input of the address adder 20. No address information is applied to the other input of the adder 20 and, hence, the address from the display register is applied unaltered at the output of the adder 20. Subsequently, the C & T 36 goes to state 16. The control signal at C16 causes the program registers 18 to store the address (read out of the display registers and applied unaltered to the output of the address adder 20) into the BUFF register. Subsequently, the C & T 36 goes to state 17.

The display registers 16 and the program registers 18 may be constructed in any one of a number of different ways. However, for purposes of explanation can be considered as having gating which stores into the appropriate register or gates out information from the appropriate register.

The control signal at C17 causes the program registers 18 to read out the address previously stored in the BUFF register and apply it to one input of the address adder 20. The control signal at C17 also causes the gate 34 to apply the δ value from the IRW contained in the C register to the other input of the address adder 20. The address adder 20 is arranged to automatically add the two values together and form the absolute address referenced by the IRW contained in the C register 10. The control signal at C17′ causes the MM register 22 to store the address output from the address adder 20. Following state 17′, the C & T 36 goes to a state wherein a control signal is applied at the MC output and the next word in the chain is read.

The foregoing description for states 15 through 17′ is for an IRW which references or points to a word within the same addressing environment as the procedure currently being executed; in other words, within the same stack as that pointed to by the display registers. An IRWS is a reference word which references or points to a word which is outside of the address environment of the procedure currently being executed.

Refer to FIG. 3. As indicated, an IRWS contains a DISP value and a δ value. The DISP value is added to the address of the base of stack contained in the BOSR register of the program registers 18 and is added to the δ value to form the address referenced by the IRWS.

Assume that the reference word contained in the A register 12 at state 14 is an IRWS. Instead of going to state 15, the C & T 36 goes to state 18. During state 18 the control signal at the C18 output causes the program registers 18 to apply the content of the BOSR register to one input of the address adder 20. The control signal at C18 also causes the gate 34 to apply the DISP field of the IRWS contained in the A register 12 to the other input of the address adder 20. The address adder 20 automatically adds the two values together to form the sum. Subsequently, state 19 is entered. The control signal at C19 causes the program registers 18 to store the sum into the BUFF register. Following state 19, state 20 of the C & T 36 is entered. During state 20 the control signal at C20 causes the content of the BUFF register in the program registers 18 to be applied to one input of the address adder 20. The control signal at C20 also causes the gate 34 to apply the δ of the IRWS contained in the C register 10 to the other input of the address adder 20. Subsequently, state 20′ is entered and the control signal at C20′ causes the MM register 22 to store the sum. Following state 20′, a state of the C & T 36 is entered wherein a control signal is formed at the MC output.

Thus, it can be seen that whether an IRW or an IRWS is stored in the A register 12 during state 14, an address will be formed which is the absolute address of a memory location where the word referenced by the IRW or IRWS can be found. The control signal at MC causes a memory cycle, similar to that described hereinabove, wherein the word stored at the absolute address is read out of the core memory 38 and is stored into the C register 10.

The control signal at M3 of the memory counter 60 following the memory cycle causes the C & T 36 to go to state 21. During state 2l the word stored in the register 10 during the preceding memory cycle is checked to see whether it is an IRW or an IRWS. If an IRW or IRWS is stored, a control signal is formed at the IRW output of the decoder 26 which causes the C & T 36 to return to state 13 and the word referenced by the IRW or IRWS stored in the C register 10 is read out and stored in the C register 10. Assume that the process is repeated until a word is stored in the C register 10 that is not an IRW or an IRWS. Under these conditions the C & T unit 36 goes from state 21 to state 22 causing the terminal flow shown in FIG. 2D to be entered.

In state 22 the word contained in the C register 10 is checked to see whether it is a DD. If it is a DD, a control signal is formed at the DD output of the decoder 26 which causes the C & T unit 36 to return to state 6, repeating the DD flow shown in FIG. 2B.

Assume that the word contained in the C register 10 is not a DD and no control signal is formed at the DD output of the decoder 26. This causes the C & T 36 to go from state 22 to state 23.

During state 23 a check is made to see whether the word contained in the C register 10 is a PCW. If the word is a PCW, the decoder 26 forms a control signal at the PCW output causing the C & T 36 to form a control signal at the PE output which, in turn, causes the data processor to do an accidental procedure entry. The accidental procedure entry caused by such a PCW is similar to that described in the above-referenced patent application entitled "Procedure Entry for a Data Processor Employing a Stack." It should be understood that the procedure entered in response to such a PCW may cause an address to be computed which, in turn, is used as an address into which the operand contained in the B register 14 is stored.

Assume that during state 23 no control signal is formed at the PCW output of the decoder 26, thereby indicating that the word contained in the C register 10 is not a PCW. This causes the C & T 36 to go to state 24 and form a control signal at the C24 output.

During state 24 a check is made to see whether the word contained in the C register 10 is an operand. If the word contained in the C register 10 is an operand, the decoder 26 forms a control signal at the OPERAND output. If the decoder 26 does not form a control signal at the OPERAND output, this indicates that some other type of word is stored in the C register 10 which is an error condition. Accordingly, the C & T unit 36 is responsive to this condition for forming a control signal at the 0I output indicating an invalid operator interrupt condition and a control signal is formed at the 0C output indicating that execution of the operator is complete.

Assume that during state 24 a control signal is formed at the OPERAND output by the decoder 26 indicating that an operand is stored in the C register 10. This condition causes the C & T 36 to go to state 25.

During state 25 a control signal is formed at the C25 output of the C & T 36 which causes the A register 12 to be cleared or reset to 0. Following state 25 the C & T 36 goes to state 26.

During state 26 a check is made to see whether the operator contained in the operator register 24 is a store destructive operator. If the operator is a store destructive operator, then state 27 is entered. The control signal at the C27 output causes the B register to be cleared or reset to 0 and subsequently the C & T 36 forms a control signal at the OC output indicating that execution of the operator is finished. If the operator stored in the operator register 24 is a store nondestructive operator, then the signal at the OC output is formed immediately following state 26.

It should now be understood that the memory contains memory locations which store words including operand words and address reference words (i.e. IRW, IRWS, DD and PCW words). An operand is stored in a memory location and is linked to a first address reference word, either directly or indirectly through other reference words by memory address signals contained in the reference words. Each of the words contain a signal which identifies the type of word. The reference words are read out of the memory location referenced by the address signal in the first address reference word and any words referenced thereby until an operand word is read. When an operand word is read, the word for storage is stored in the same location from which the operand word is read. The decoder 26 and the elements 54 through 58 form means for monitoring the tag or type signals in each word for the operand word and, hence, cause the word to be stored when the operand word is encountered.

Although the flow diagrams show that certain checking operations, such as at C1, C4, C5, C6, C8, C9, etc. occur sequentially, that many or most all of these monitoring steps could be performed simultaneously with operations or, even in certain cases, simultaneously with each other and, hence, need not be done sequentially.

Although one example of the present invention has been shown by way of illustration, it should be understood that there are many other rearrangements and embodiments of the present invention within the scope of the following claims.

We claim:

1. In a data processing system the combination comprising:
memory means having memory locations containing words including operand words and address reference words, an operand stored in a memory location being linked to a first address reference word directly or indirectly through other address reference words by a memory address signal in each address reference word, each of said words containing a type signal identifying the type of word,
means for reading from the memory means the word in the memory location referenced by the address signal in said first address reference word and any words referenced by such read address reference word until an operand word is read,
means for monitoring the type signal of the word read for an operand type word, and
means for storing a desired word into the memory location from which an operand word is read.

2. In a data processing system according to claim 1 including register means for storing operators including a store operator and wherein said means for reading and means for storing operate responsive to a single store operator stored therein.

3. In a data processing system according to claim 2 comprising register means for storing the desired word which is to be stored into the memory means, the means for storing a desired word obtaining such word from said register means.

4. In a data processing system according to claim 2 including second register means for sequentially storing said first address reference word and any other reference words referenced thereby as they are read from said memory means.

5. In a data processing system according to claim 4 including control means for applying a control signal to said reading means causing another word to be read out of the memory means in response to a word in said second register means containing an address reference word type signal.

6. In a data processing system according to claim 5 including means for monitoring the type signals of the words stored in said second register means and for providing an indication of an address reference word therein to said control means.

7. In a data processing system according to claim 1 wherein said address reference words include words referencing a different procedure for execution by the data processing system and wherein said type signals identify such procedure reference word and including monitoring means for inspecting the type signals of said address reference words which are read from said memory means and for providing a unique output signal to the data processing system signalling that control is to be transferred to a different procedure upon detecting a procedure reference word type signal.

8. In a data processing system according to claim 7 wherein said memory means comprises a first register means for temporarily storing the word to be stored in said memory means and a second register means for temporarily storing the word read from the memory means, means responsive to said monitoring means for storing into the memory means the word from said first register means upon detection of an operand word type signal and for storing the word from said second register means upon detection of an address reference word type signal read from the memory means.

9. In a data processing system according to claim 1 wherein said address reference words include an indirect reference word and data descriptors, the indirect reference words being able to reference other indirect reference words, data descriptors and operands whereas the data descriptors being able to reference only other data descriptors and operands, the type signals uniquely identifying indirect reference words and data descriptors, means for monitoring the type signals and for providing an output signal indicative of the different types of address reference words, means responsive to the type signal of the words read from the memory means for providing an error signal when a data descriptor references an indirect reference word.

10. In a data processing system the combination comprising:
memory means having addressable memory locations containing words making up at least one stack of information, such words including address reference words each of which contains an address signal referencing another memory location which may contain another address reference word or an operand, each word containing a type signal identifying whether it is an address reference word type or an operand word type, first register means for storing operators including a store operator, second register means for storing a word to be stored, third register means for storing an address reference word, means for applying to the memory means an address corresponding to the address signal in an address reference word contained in said third register means, decoding means responsive to the type signal of an address reference word stored in said third register means for forming an output signal corresponding to the type of word, control means responsive to a store operator and said output signal indicating an address reference word for controlling and thereby causing the address applying means to apply such corresponding address to the memory means and for causing the memory means to read out the content of such address, means for coupling a readout address reference word back to the third register means, said control means being responsive to a further output signal indicating a further address reference word in said second register means for repeating the control of said address applying means and said memory means causing a further word to be read out and means for monitoring the type signal of the word read from said memory means and for causing the word in said second register means to be stored into a memory location from which a word is read having an operand type signal.

11. In a data processing system the combination comprising:
memory means having addressable memory locations containing words, such words including address reference words each of which contains an address signal referencing another memory location which may contain another address reference word or an operand, each word containing a type signal identifying whether it is an address reference word type or an operand word type, first register means for storing operators including a store operator, second register means for storing a word to be stored in memory means, third register means for storing an address reference word, means for applying to the memory means an address corresponding to the address signal in an address reference word contained in said third register means, control means responsive to a store operator in said first register means and a type signal in said third register means indicating an address reference word for controlling and thereby causing the address applying means to apply such corresponding address to the memory means and for causing the memory means to read out the content of such address, means for coupling a readout address reference word back to the third register means, said control means being responsive to a further type signal in the third register means indicating a further address reference word for repeating the control of said address applying means and said memory means causing a further word to be read out and means for monitoring the type signal of the word read from said memory means and for causing the word in said second register means to be stored into a memory location from which a word is read having an operand type signal.

12. A method for storing a word in a memory of a data processing system wherein the memory location for storing contains an operand and is linked either through one or through more address reference words to a first address reference word and wherein an address reference word and an operand word contain type identification signals, comprising the steps of reading from the memory the word referenced by said first address reference word and any words referenced by such read word until an operand word is read, monitoring the type signals of the words read for an operand type signal and storing a desired word into the memory location from which a word is read having an operand type signal.

13. A method for storing a word in a memory of a data processing system responsive to a store operator in a program wherein the memory location for storing contains an operand and is linked either through one or through more address reference words to a first address reference word and wherein an address reference word and an operand word contain type identification signals, comprising the steps of detecting a store operator and responding to a single store operator for performing the steps of reading from the memory the word referenced by said first address reference word and any words referenced by such read word until an operand word is read, monitoring the type signals of the words read for an operand type signal and storing a desired word into the memory location from which a word is read having an operand type signal.

PO-1050
(5/69)

UNITED STATES PATENT OFFICE
CERTIFICATE OF CORRECTION

Patent No. 3,611,310 Dated October 5, 1971

Inventor(s) Bobby A. Creech, Benjamin A. Dent and Erwin A. Hauck

It is certified that error appears in the above-identified patent and that said Letters Patent are hereby corrected as shown below:

Col. 1, line 70, "word" should read --words--;

Col. 2, line 22, delete "in", first occurrence;

Col. 3, line 53, "respectively, to" should read --respectively. To--;
line 54, "10A" should read --10a--;
line 66, delete the sentence beginning with "A gate 35" cancel lines 67 and 68;

Col. 4, line 59, "STuffed" should read --Stuffed--;
line 63, delete "is" and insert --identifies--;

Col. 5, line 48, "a" should read --A--;
line 68, "FIGS." should read --FIG.--;

Col. 6, line 42, delete "and"

Col. 7, line 6, insert a comma after "10b";
line 47, "words" should read --word--.

Signed and sealed this 25th day of April 1972.

(SEAL)
Attest:

EDWARD M.FLETCHER,JR.
Attesting Officer

ROBERT GOTTSCHALK
Commissioner of Patents